(12) United States Patent
Ternus

(10) Patent No.: US 6,899,311 B1
(45) Date of Patent: May 31, 2005

(54) EASEL DISPLAY ARRANGEMENT

(75) Inventor: John P. Ternus, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/349,869

(22) Filed: Jan. 22, 2003

(51) Int. Cl.[7] .............................................. A47G 1/24
(52) U.S. Cl. ...................................... 248/454; 248/469
(58) Field of Search ................................ 248/469, 474, 248/454, 457, 441.1; 16/370, 374, 341, 342, 16/277, 299, 255

(56) References Cited

U.S. PATENT DOCUMENTS

| | | | |
|---|---|---|---|
| 4,515,338 A * | 5/1985 | Schneider .................... 248/460 |
| 4,692,838 A | 9/1987 | Merchant ..................... 361/679 |
| 4,897,873 A | 1/1990 | Beutler et al. ......... 379/433.13 |
| 5,165,145 A | 11/1992 | Sherman |
| 5,269,047 A * | 12/1993 | Lu ............................... 16/340 |
| 5,542,152 A | 8/1996 | Crompton et al. |
| 5,555,157 A | 9/1996 | Moller et al. ................ 361/683 |
| 5,566,424 A | 10/1996 | Crompton et al. |
| 5,789,828 A | 8/1998 | Tremaine et al. ............. 307/64 |
| 5,927,673 A * | 7/1999 | Kurokawa et al. .......... 248/456 |
| 6,108,868 A | 8/2000 | Lin .............................. 16/340 |
| 6,148,480 A | 11/2000 | Cooke |
| 6,252,767 B1 | 6/2001 | Carlson ....................... 556/450 |
| 6,256,129 B1 | 7/2001 | Kim et al. ................... 398/129 |
| 6,347,433 B1 | 2/2002 | Novin et al. |
| 6,402,109 B1 | 6/2002 | Dittmer |
| 6,505,382 B1 | 1/2003 | Lam et al. ................... 239/316 |
| 6,507,485 B2 | 1/2003 | Zadesky ...................... 473/407 |
| 6,609,272 B1 * | 8/2003 | Lee .............................. 16/307 |
| 6,651,943 B2 * | 11/2003 | Cho et al. ................. 248/122.1 |

\* cited by examiner

*Primary Examiner*—Ramon O Ramirez
(74) *Attorney, Agent, or Firm*—Beyer Weaver & Thomas, LLP

(57) ABSTRACT

A display arrangement is disclosed. The display arrangement includes a flat panel display. The display arrangement further includes a display housing for the flat panel display. The display arrangement also includes an adjustable leg for supporting the display housing and thus the flat panel display in an inclined position. The display arrangement additionally includes a hinge for coupling the adjustable leg to the display housing so that the adjustable leg is pivotable relative to the display housing. The hinge is configured to provide a tilting action for adjusting the tilt angle of the display arrangement, and a collapsing action for reducing the depth of the display arrangement.

34 Claims, 11 Drawing Sheets

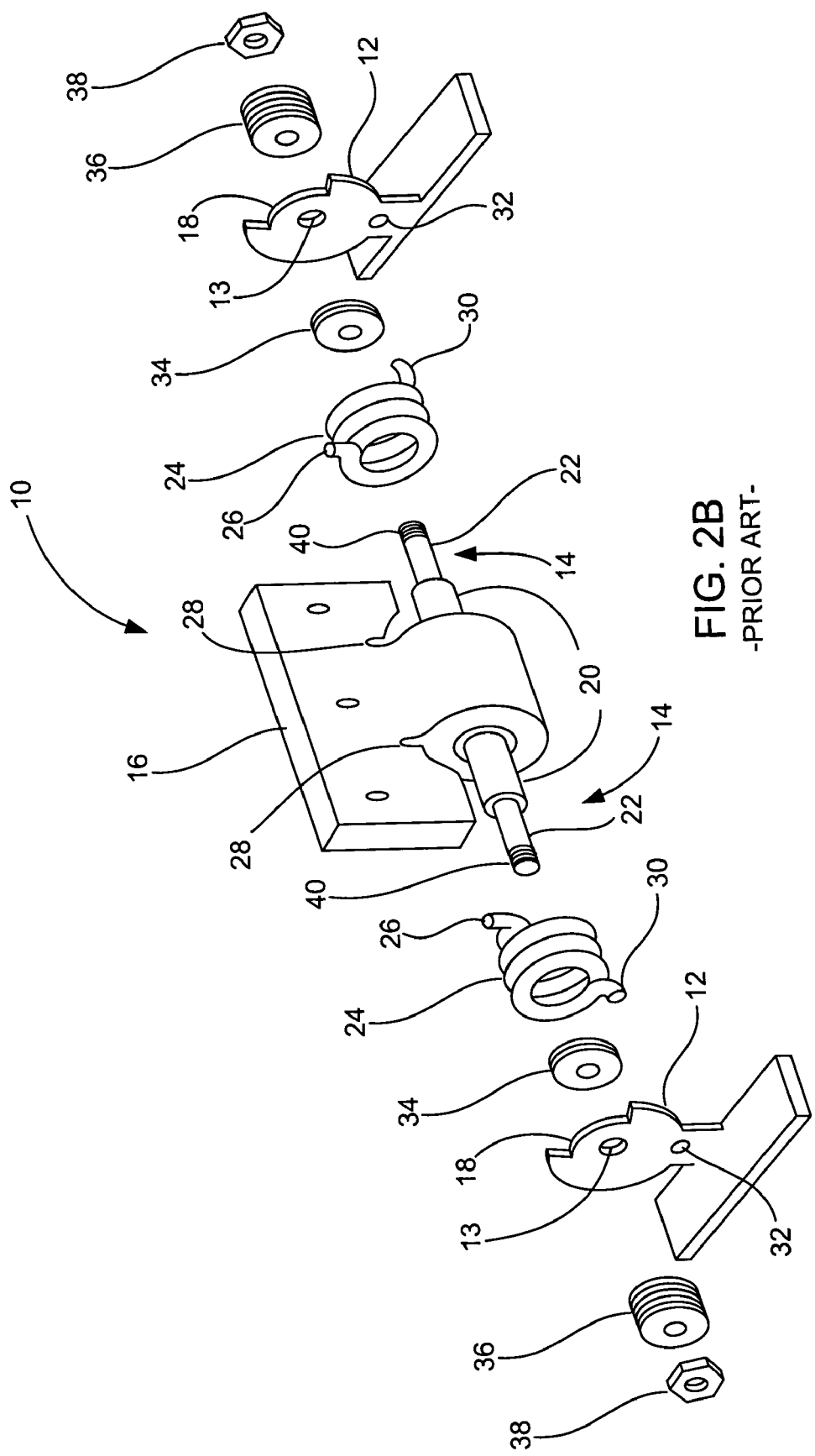
FIG. 2B -PRIOR ART-

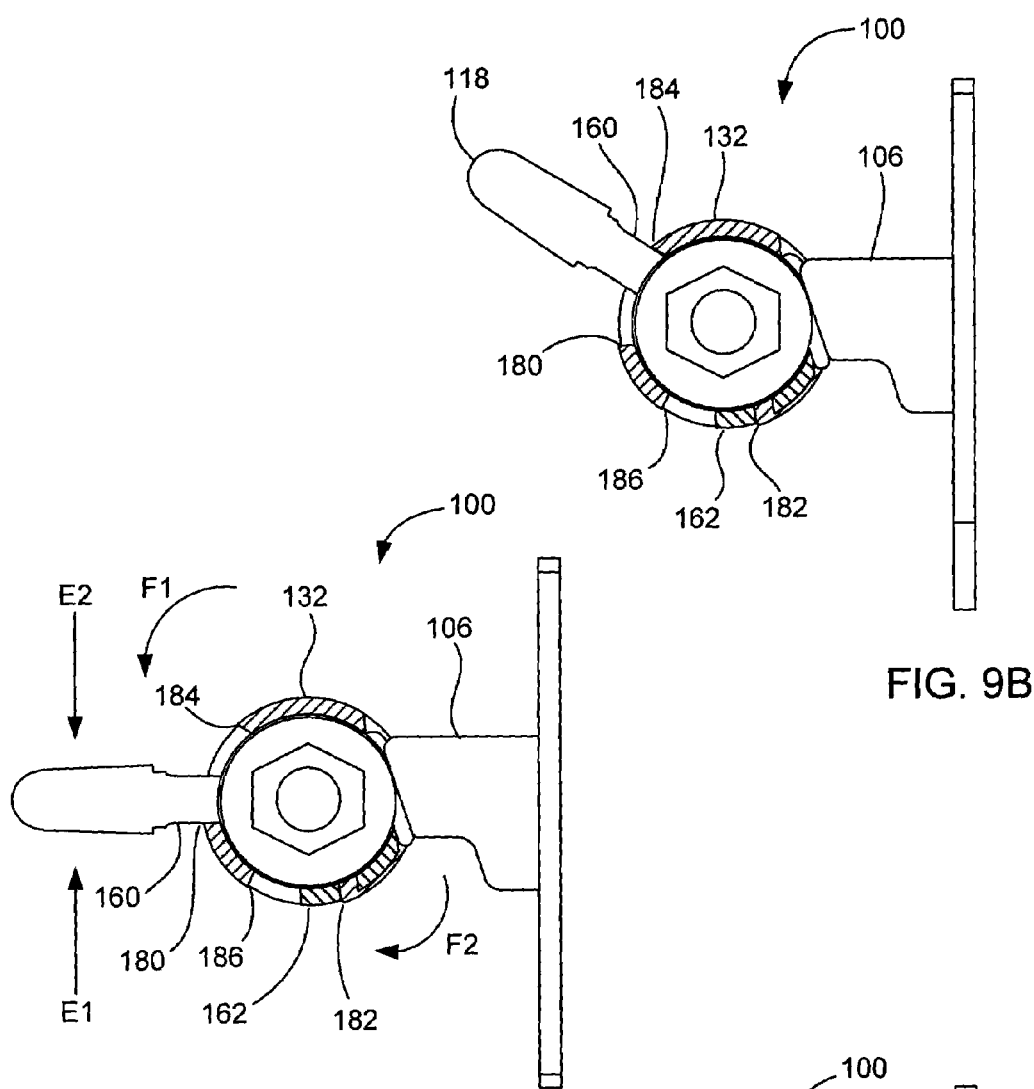
FIG. 9B
FIG. 9A
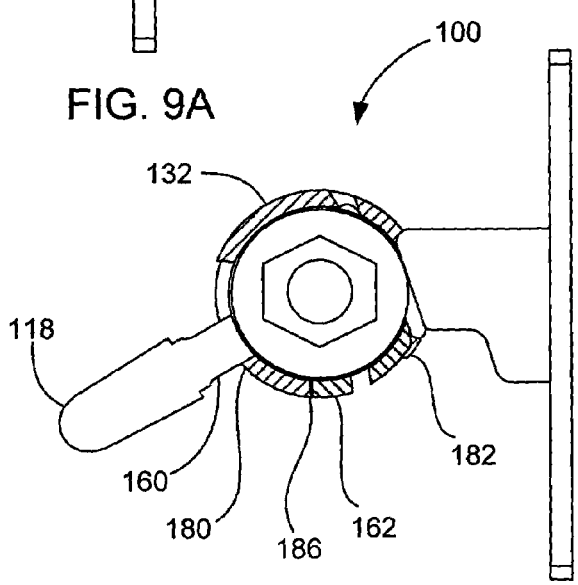
FIG. 9C

EASEL DISPLAY ARRANGEMENT

BACKGROUND OF THE INVENTION

1. Field of the Invention

The present invention relates generally to an easel display arrangement utilizing a flat panel display. More particularly, the present invention relates to a hinge assembly for use in an easel display arrangement.

2. Description of the Related Art

Display arrangements utilizing flat panel displays have become increasingly popular in recent years. These type of display arrangements are typically held upright or close to upright during use. For example, they may be vertically mounted on a wall, or they may include a stand for vertically supporting the display arrangement on a horizontal surface. In some cases, the angle of the display arrangement relative to vertical is adjustable for optimum viewing. Various positioning devices have been used to adjust the viewing angle of the display arrangement. In one design, the positioning device includes a hinge that pivotally couples the display arrangement to a stationary stand. The hinge allows the display arrangement to pivot relative to the stationary stand so that the inclined position of the display arrangement can be adjusted. In another design, the positioning device includes a movable leg that is pivotally coupled to the display arrangement via a hinge. The hinge allows the movable leg to pivot relative to the display arrangement so that the inclined position of the display arrangement can be adjusted. In some designs, the hinge uses friction or spring force to hold the leg at a desired angle relative to the display arrangement.

FIGS. 1A and 1B are diagrams of a display arrangement 1 with an easel like enclosure 2. The easel like enclosure 2 includes a housing 4 for containing a liquid crystal display (LCD) 6. The easel like enclosure 2 also includes a leg 8 connected to the back of the housing 4 for keeping the display arrangement 2 in an upright position when sitting on a surface. The leg 8 can typically be placed in more than one position so as to adjust the tilt angle of the display arrangement 1. For example, the leg 8 may be coupled to the housing 4 via a hinge 10. The hinge 10 allows the leg 8 to pivot relative to the housing 4 between an initial position (as shown), placing the leg a first distance away from the back of the housing, and a final position, placing the leg a second distance away from the housing. The first distance is spaced apart from the back of the housing so as to provide minimum tilt to the display arrangement 1. The second distance is typically further than the first distance so as to provide maximum tilt to the display arrangement 1. The hinge 10 typically includes torque components for holding the leg 8 in a position between the initial and final positions so that the display arrangement 1 can maintain a desired user tilt. By way of example, the display arrangement may correspond to a cinema display manufactured by Apple Computer of Cupertino, Calif.

FIGS. 2A and 2B are diagrams of the hinge 10 used to support the display arrangement 1 in an inclined position for optimum viewing. As shown in both figures, the hinge 10 includes a pair of support arms 12 that cooperate to pivotally support a shaft 14. The shaft 14 has a pivoting foot 16 fixed thereto. The pivoting range of the foot 16 is restrained by support arm cut outs 18. The cut outs 18 allow the foot 16 to pivot between a first foot position (solid line) and a second foot position (dotted line). When assembled, the first foot position corresponds to the initial leg position and the second foot position corresponds to the final leg position.

Although not shown, the support arms 12 are typically fixed to a structural component of the display arrangement 1, as for example, the housing 4 of the display arrangement 1, and the foot 16 is typically attached to the leg 8. When assembled, the leg 8 is capable of pivoting away from the display arrangement 1 so as to adjust the inclined position of the display arrangement 1.

Referring to FIG. 2B, the pivoting shaft 14 includes an inner portion 20 and an outer portion 22. The foot 16 is fixed to the inner portion 20. The outer portion 22 is placed within an opening 13 in the support arm 12 so as to allow the shaft 14 to pivot relative to the support arm 12. A torsion spring 24 is fitted over the inner portion 20 of the shaft 14 and includes a first end 26 that is inserted into a groove 28 on the foot 16 and a second end 30 that is inserted into an opening 32 in the support arm 12. The torsion spring 24 provides a spring bias between the foot 16 and the support arms 12. The spring bias typically biases the foot 16 in the first foot position (see FIG. 2A). The torque provided by the spring bias typically holds the leg in the desired tilt position. Washers 34 are placed over the outer portion 22 of the shaft 14. When assembled, the washers 34 are disposed between the end of the inner portion 20 of the shaft 14 and the inner side of the support arm 12. The hinge 10 also includes a plurality of frictional washers 36 and a nut 38 that is threaded to the end 40 of the shaft 14. The nut 38 supplies an axial load through the frictional washers 36, through the support arms 12, through the washers 34 and to the inner portion 20 of the shaft 14. This arrangement provides a dampening to the torque supplied by the torsion spring 24.

Although hinge designs such as these work well, there are continuing efforts to improve their form, feel and functionality. For example, it would be desirable to improve the hinge design so that the display arrangement can be packed more efficiently thereby decreasing the costs associated with storage and shipping. It would also be desirable to improve the hinge design so that the display arrangement can be carried more easily. As should be appreciated, in order to vertically support the display arrangement, the end of the leg is positioned away from the display arrangement, i.e., jetting out. As a result, the overall depth of the display arrangement may be large (as compared to just the flat panel display) thus making it difficult to package and carry.

SUMMARY OF THE INVENTION

The invention relates, in one embodiment, to a display arrangement. The display arrangement includes a flat panel display. The display arrangement further includes a display housing for the flat panel display. The display arrangement also includes an adjustable leg for supporting the display housing and thus the flat panel display in an inclined position. The display arrangement additionally includes a hinge for coupling the adjustable leg to the display housing so that the adjustable leg is pivotable relative to the display housing. The hinge is configured to provide a tilting action for adjusting the tilt angle of the display arrangement, and a collapsing action for reducing the depth of the display arrangement.

The invention relates, in another embodiment, to an easel enclosure for a display. The easel enclosure includes a body configured to carry the display. The easel enclosure further includes an adjustable leg for supporting the body in an inclined position. The easel enclosure also includes a hinge for pivotally coupling the adjustable leg to the body. The hinge allows the adjustable leg to pivot through a collapsing range and a tilting range. The collapsing range allows the adjustable leg to be placed between a storage position against the base and a first tilt position away from the base. The tilting range allows the adjustable leg to be placed between the first tilt position and a second tilt position that is further away from the base than the first tilt position.

The invention relates, in another embodiment, to a hinge assembly for use in an easel like enclosure. The hinge assembly includes a pair of spaced apart hinge stands. The hinge stands are mountable to a housing of the easel like enclosure. The hinge assembly further includes a shaft rotatable relative to the hinge stands. The hinge assembly also includes a tongue attached to the shaft. The tongue is mountable to a leg of the easel like enclosure. The hinge assembly additionally includes a stop plate configured to limit the motion of the tongue in a first and a second direction. Moreover, the hinge assembly includes a spring capable of providing a spring bias between the tongue and the stop plate in the first direction and a dampening mechanism capable of dampening the motion of the tongue in the first direction.

The invention relates, in another embodiment, to a hinge assembly for use in an easel like enclosure. The hinge assembly is configured to provide a tilting action in a first direction and a collapsing action in a second direction. The hinge assembly includes a pair of spaced apart hinge stands which are mountable to a housing of the easel like enclosure. The hinge stands include a through hole for receiving components of the hinge assembly. The hinge assembly also includes a rotatable shaft having an inner portion and an outer portion. The inner portion has a larger diameter than the outer portion so as to form a shoulder. The outer portion is inserted within the through holes of the hinge stands. The hinge assembly further includes a tongue attached to the inner portion of the shaft such that it rotates with the shaft in the first and second directions. The tongue is mountable to a leg of the easel like enclosure. The hinge assembly additionally includes a stop plate having a through hole for receiving the outer portion of the shaft. The stop plate is positioned on the outer portion of the shaft between the shoulder and a portion of a first hinge stand. The stop plate is configured to limit the rotation of the tongue in the first and second directions. Moreover, the hinge assembly includes a collar inserted within the through hole of the first hinge stand. The collar has a through hole for receiving the outer portion of the shaft. The collar is positioned on the outer portion of the shaft between the stop plate and a nut coupled to the end of the outer portion of the shaft and capable of exerting an axial load. The collar is configured to couple the axial load to the stop plate and onto the shoulder of the inner portion of the shaft, and to decouple the axial load from the hinge stand.

DETAILED DESCRIPTION OF THE DRAWINGS

The invention will be readily understood by the following detailed description in conjunction with the accompanying drawings, wherein like reference numerals designate like structural elements, and in which:

FIG. 2B is an exploded perspective view of a hinge used to support a display arrangement in an inclined position.

FIG. 6B is a side view of the display arrangement at a second tilt angle, in accordance with one embodiment of the present invention.

FIG. 9A is a side view of a hinge assembly showing the tongue in an initial position, in accordance with one embodiment of the present invention.

FIG. 9B is a side view of a hinge assembly showing the tongue in a full tilt position, in accordance with one embodiment of the present invention.

FIG. 9C is a side view of a hinge assembly showing the tongue in a full collapsed position, in accordance with one embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

The invention generally pertains to improved techniques for supporting a display arrangement such as those that contain a flat panel display. Broadly, the invention relates to an easel set up for supporting the display arrangement in an upright or nearly upright position. The easel set up generally includes an adjustable leg that pivots relative to the housing of the display arrangement so as to place the display arrangement in an inclined position for viewing. More specifically, the invention relates to a hinge assembly that provides both a tilting motion and a collapsing motion to the adjustable leg. The tilting motion gives the user of the display arrangement, the ability to adjust the inclined position for viewing, and the collapsing motion gives the user the ability to adjust the depth of the display arrangement for packaging or transporting. For example, the hinge assembly may reduce the depth of the display arrangement by 33%. By reducing the depth, the display arrangement may be packed more efficiently thereby decreasing the costs associated with storage and shipping, i.e., it can be placed in a smaller box. The hinge also makes the display arrangement easier to carry since the profile is more planar.

It is contemplated that the present invention may be adapted for any of a number of suitable and known consumer electronic products. By way of example, the consumer electronic products may relate to computer displays, media displays (e.g., TV, video) and the like. The computer displays are typically used in computer systems that process, send, retrieve and/or store data. The computing systems may generally relate to desktop computers that sit on desks, floors or other surfaces, portable computers that can be easily transported by a user, or handheld computing devices.

Embodiments of the invention are discussed below with reference to FIGS. 3–10. However, those skilled in the art will readily appreciate that the detailed description given herein with respect to these figures is for explanatory purposes as the invention extends beyond these limited embodiments.

Figure 1A:
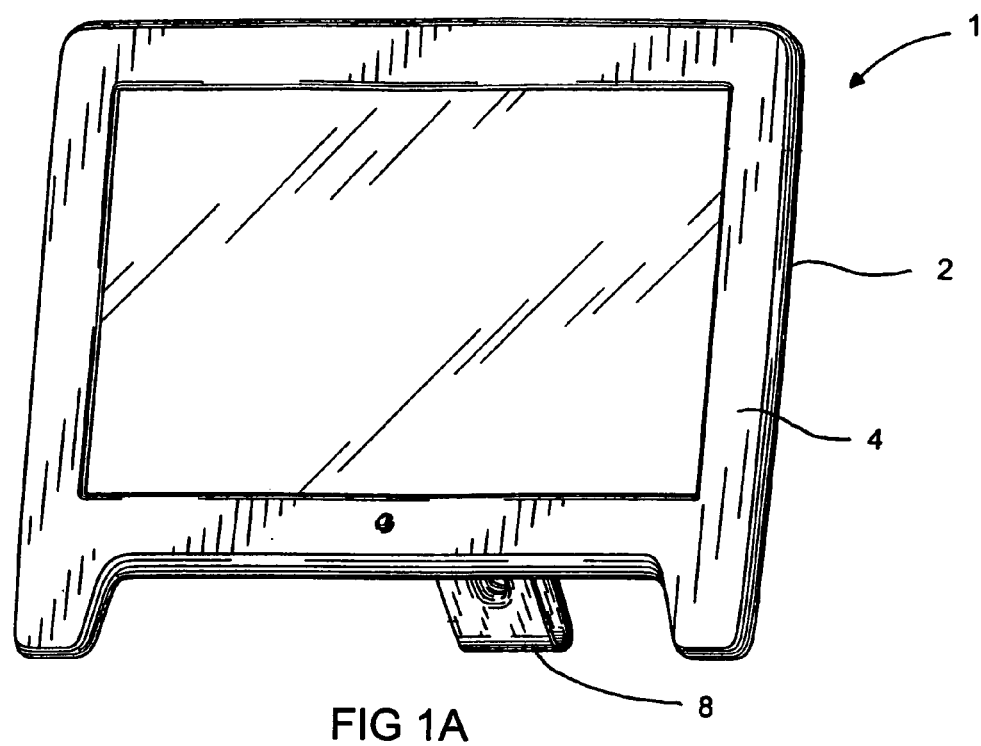
FIG. 1A is a front perspective view of a display arrangement in an inclined position.
Figure 1B:
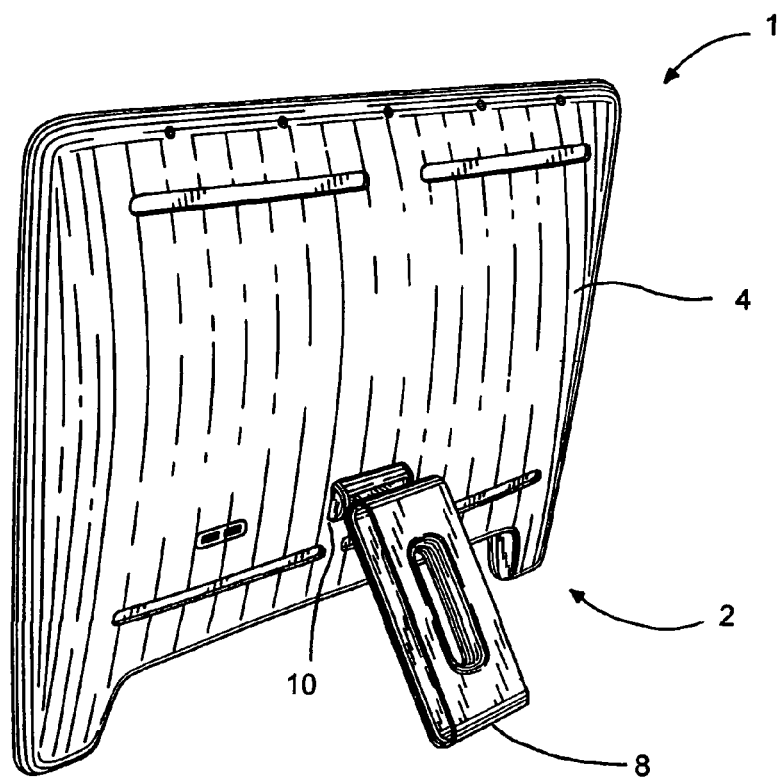
FIG. 1B is a back perspective view of a display arrangement in an inclined position.
Figure 2A:
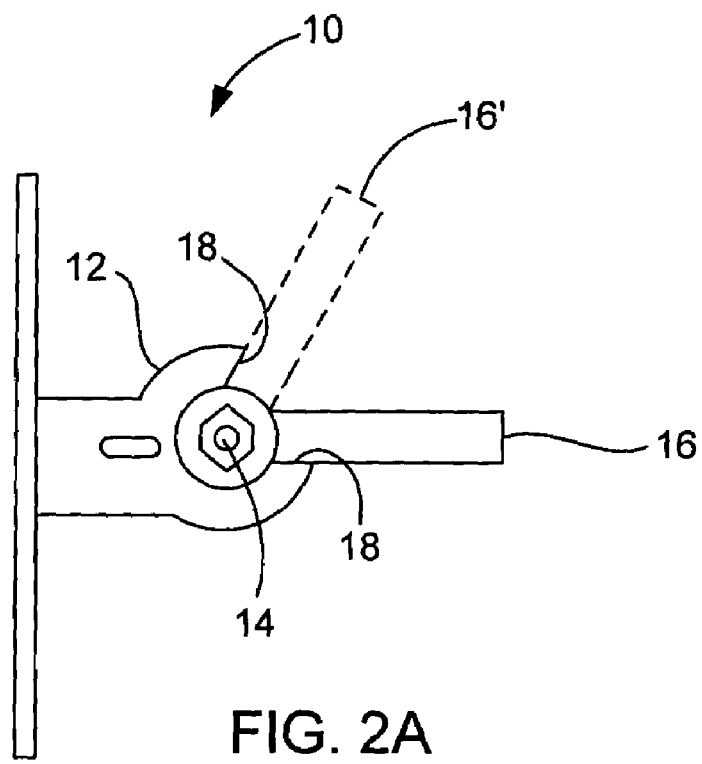
FIG. 2A is a side elevation view of a hinge used to support a display arrangement in an inclined position.
Figure 3:
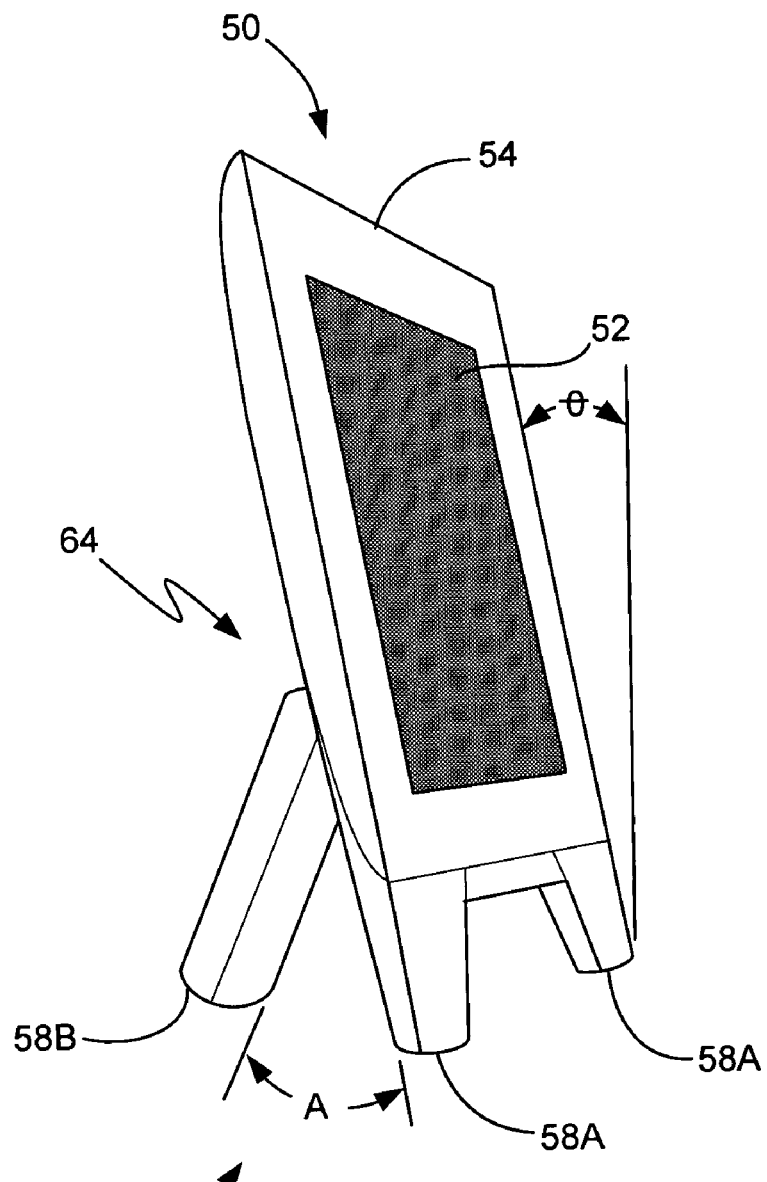
FIG. 3 is a perspective view of a display arrangement, in accordance with one embodiment of the present invention.

FIG. 3 is a perspective view of a display arrangement 50, in accordance with one embodiment of the present invention. The display arrangement 50 generally includes a flat panel display 52 configured to display graphical information such as video or a graphical user interface (GUI) to a user. By way of example, the flat panel display 52 may be a liquid crystal display (LCD), plasma display panel (PDP), electron luminescent display (ELD), or the like. The display arrangement 50 also includes a display housing 54 configured to surround the flat panel display 52 and its associated electronics at a peripheral region thereof so as to cover and protect these components from adverse conditions. The display housing 54 generally defines the shape or form of the display arrangement 50, i.e., the contour of the display housing 54 embodies the outward physical appearance of the display arrangement 50. The contour may be rectilinear, curvilinear or both.

The display arrangement 50 also includes an easel mechanism 56 configured to support the display housing 54 and thus the flat panel display 52 in an upright or nearly upright position. The easel arrangement 56 generally includes a plurality of support members 58 that together provide a base for the display arrangement 50 to rest. The support members 58 may be separate elements and/or they may be integrally formed with the display housing 54. In most cases, the support members 58 are designed for three point stability, which tends to provide maximum support (e.g., tripod). As should be appreciated, three points define a plane and therefore it is preferable to have three points supporting the display arrangement. Three points tend to eliminate the rocking caused by other multiple point arrangements. It should be noted, however, that three points is not a limitation that any number of points may used so long as they are configured to support the display arrangement. For example, four points may be used.

In the illustrated embodiment, the support members 58 of the easel mechanism 56 take the form of a plurality of legs including a pair of fixed legs 58A and an adjustable rear leg 58B (three points). The pair of fixed legs 58A are an extension of the display housing 54 and the adjustable rear leg 58B is coupled to the back of the display housing 54. The fixed legs 58A generally extend from the bottom of the display housing 54 and are spaced apart at each side of the display housing 54 to provide the greatest stability to the display arrangement 50. Alternatively, the bottom surface of the display housing 54 may be used. The adjustable rear leg 58B generally protrudes from the middle of the display housing 54, i.e., evenly spaced between the two fixed legs 58A. In one embodiment, the adjustable rear leg 58B is inwardly movable so as to place the leg 58B next to the housing 54, and outwardly movable so as to place the leg 58B away from the base. The leg 58B is generally configured to support the housing 54 in an inclined position when placed away from the housing 54.

Figure 6A:
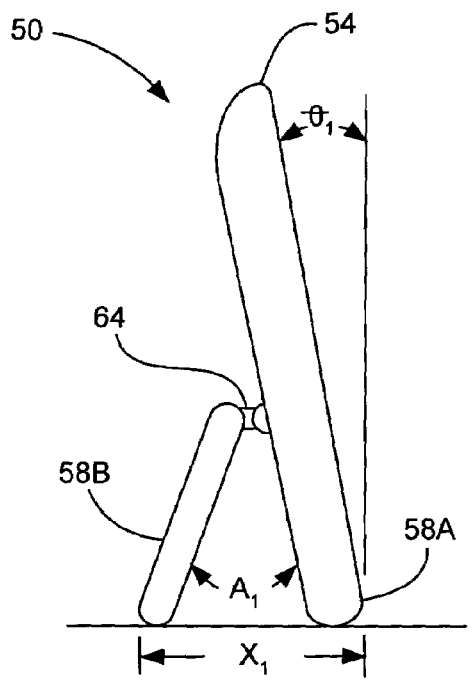
FIG. 6A is a side view of the display arrangement at a first tilt angle, in accordance with one embodiment of the present invention.
Figure 6A:
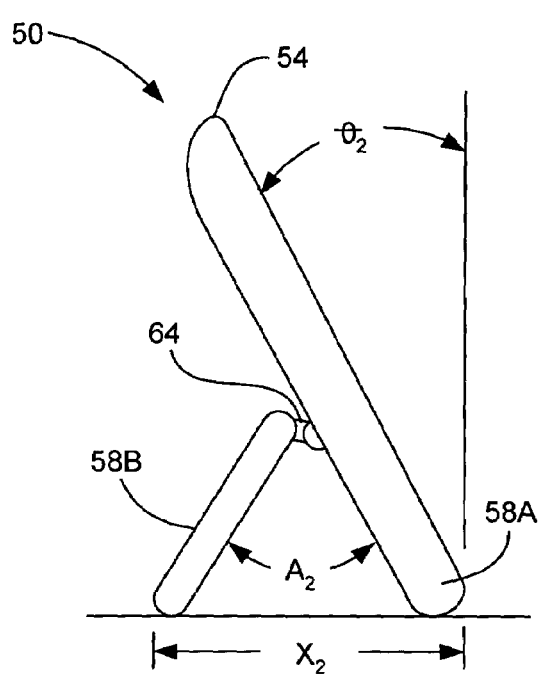

To elaborate, the adjustable rear leg 58B may be moved to various angles A relative to the display housing 54 so as to adjust the tilt angle $\theta$ of the display housing 54 and thus the flat panel display 12. For example, the adjustable rear leg may move relative to the display housing between a first angle $A_1$ and a second angle $A_2$ in order to adjust the tilt angle between a first tilt angle $\theta_1$ and a second tilt angle $\theta_2$ (as shown in FIGS. 6A and 6B). In most cases, the initial or first tilt angle $\theta_1$ is set at 10 degrees in order to pass safety requirements, i.e., the display arrangement can tilt 10 degrees in any direction (forwards or backwards) without tipping over. The actual tilt range may be widely varied. By way of example, the tilt angle range may be between about 10 and about 30 degrees, and more particularly at about 20 degrees. In one particular embodiment, the tilt angle may be adjusted between 10 and 30 degrees, i.e., the first tilt angle is 10 degrees and the second tilt angle is 30 degrees.

The adjustable rear leg 58B is generally coupled to the display housing 54 via a hinge assembly 64 so that the adjustable rear leg 58*b* can pivot relative to the display housing 54. For example, the adjustable rear leg 58*b* can pivot away from the display housing 54 to increase the tilt angle $\theta$ until a maximum tilt angle is reached or it can pivot towards the display housing 54 to decrease the tilt angle $\theta$ until a minimum tilt angle is reached. In most cases, the hinge assembly 64 is configured to prevent any further pivoting once the desired tilt angle is found. For example, it may include one or more components that hold the adjustable rear leg 58B in a locked or secured position when not pivoting. The adjustable rear leg 58B may also pivot further towards the housing to a point next to the housing so that the overall depth of the display arrangement is small as compared to when the display arrangement is tilted.

Figure 4:
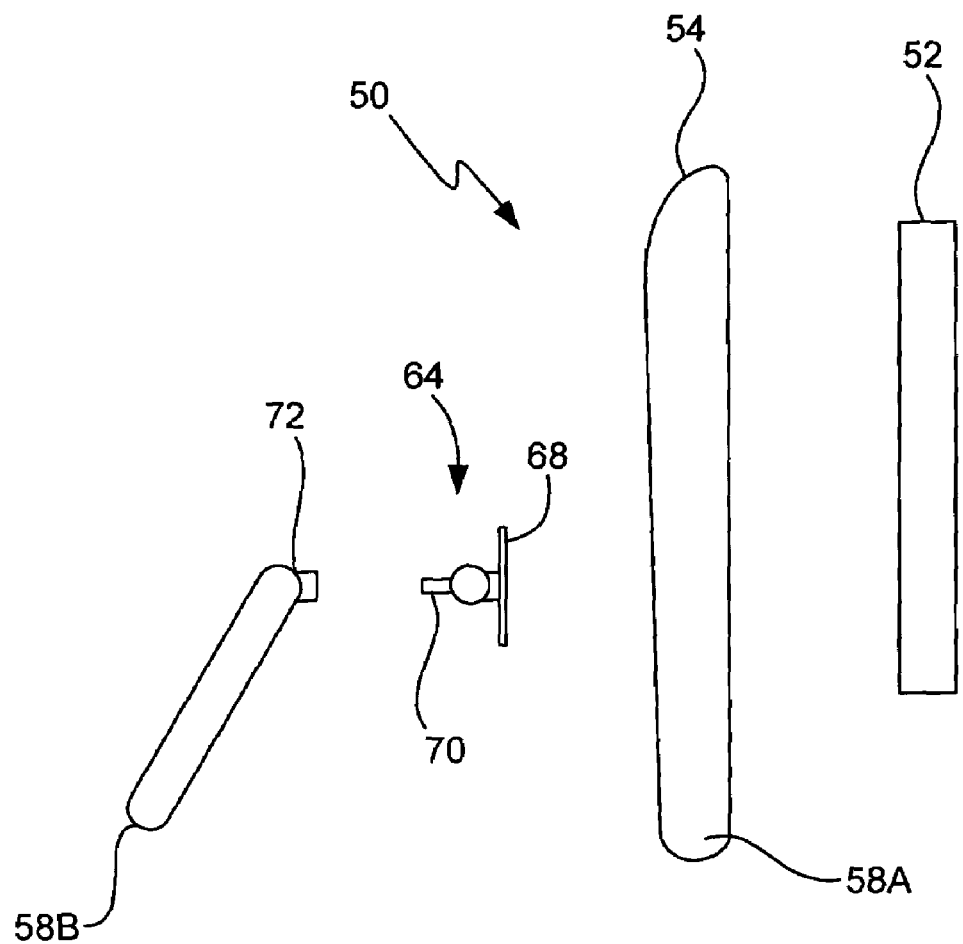
FIG. 4 is broken away side view of the display arrangement, in accordance with one embodiment of the present invention.

Referring to FIG. 4, the components of the display arrangement 50 will be described in greater detail. In this particular embodiment, the legs 58A are integrally formed with the display housing 54. By way of example, the display housing 54 as well as the legs 58A may be formed from plastic such as polycarbonate. The adjustable rear leg 58B, on the other hand, is movably coupled to the display housing 54 via the hinge assembly 64. In most cases, the hinge assembly 64 is attached to the back of the display housing 54 or some other structural element contained therein (e.g., frame or chassis). The hinge assembly 64 generally includes a base 68 for providing a connection point to the display housing 54. For example, the hinge assembly 64 may be screwed to the display housing 54 using one or more screws that secure the base 68 to the display housing 54. The hinge assembly 64 also includes a tongue 70 that rotates relative to the base 68. The tongue 70 provides a pivoting connection point to the adjustable rear leg 58B. For example, the tongue 70 may be screwed to a mounting area 72 that extends from the adjustable rear leg 58B using one or more screws that secure the tongue 70 to the adjustable rear leg 58B.

Figure 5:
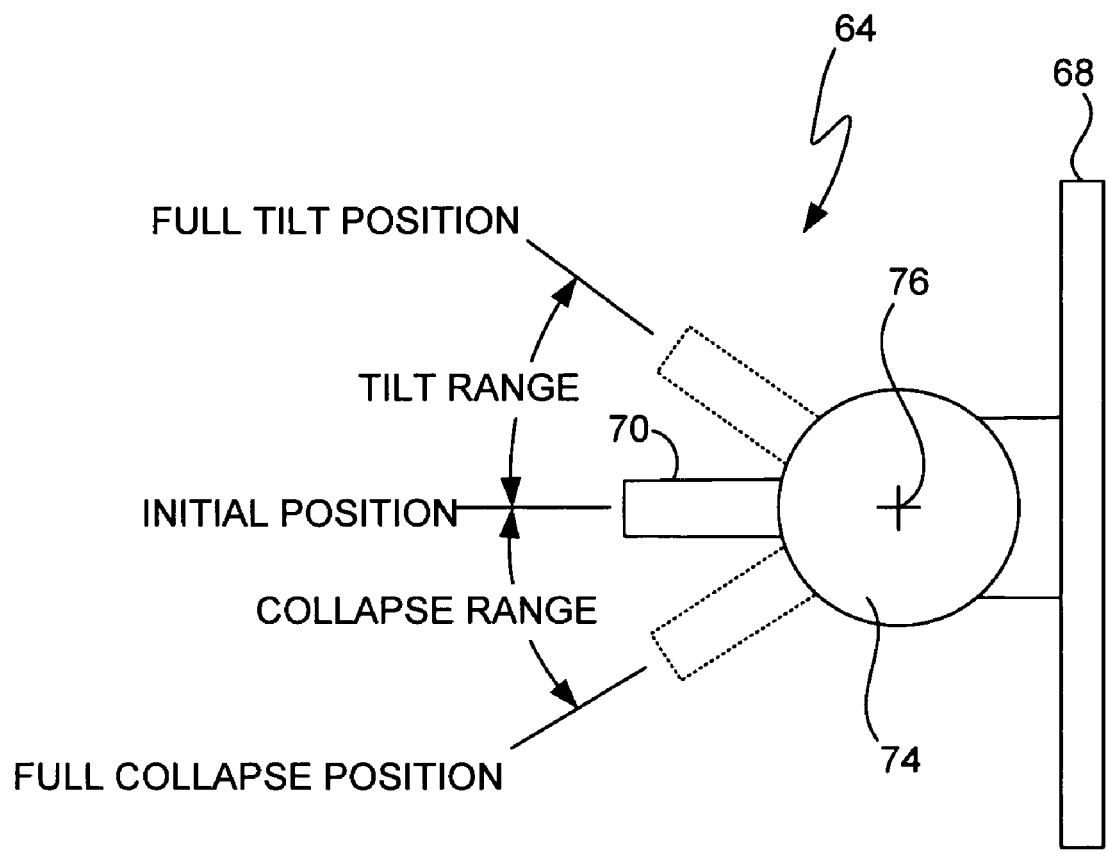
FIG. 5 is a simplified side view of a hinge assembly, in accordance with one embodiment of the present invention.

Referring to FIG. 5, the hinge assembly 64 will be described in greater detail. As shown, the tongue 70 rotates relative to the base 68 about an axis 76. The tongue 70 is configured to rotate within a tilt range and a collapse range. The collapse range is generally opposite the tilt range. That is, the tilt range is located on a first side of an initial tongue position, and the collapse range is located on a second side of the initial tongue position. The tilt range generally defines the range within which the tongue may rotate to place the adjustable leg (when attached thereto) in a position for supporting the display housing in an inclined position, i.e., moving the display housing 54 and thus the flat panel display 52 to various tilt angles. The collapse range, on the other hand, generally defines the range within which the tongue may rotate to place the adjustable leg (when attached thereto) closer to the back side of the display housing in order to reduce the overall depth of the display arrangement for traveling and/or packaging purposes, i.e., allowing the adjustable rear leg 62 to collapse next to the back side of the display housing 54.

The tilt range is generally defined by the initial tongue position and a full tilt tongue position, and the collapsible range is generally defined by the initial tongue position and a full collapsed tongue position. The initial tongue position generally produces the least amount of tilt angle $\theta$, as for example 10 degrees, and the full tilted tongue position generally produces the greatest amount of tilt angle $\theta$ as for example 30 degrees. The full collapsed tongue position, on the other hand, generally produces the most reduced depth D of the display arrangement 50. By way of example, it may place the adjustable rear leg adjacent the backside of the housing.

The hinge assembly 64 also includes a hinge mechanism 74 that provides other functions to the hinge assembly 64. For example, the hinge mechanism may be configured to control the rotating motion of the tongue relative to the base. In one implementation, the hinge mechanism includes one or more positioning components for locking or holding the tongue in a desired location, as for example, a position within the two ranges. By way of example, the positioning component may correspond to a spring element that provides a spring force through the tilting range that works against the external forces acting on the tongue in order to help hold the tongue in a desired tilt position. The balancing force generally depends on the center of mass of the display arrangement, the angle of the adjustable leg and the weight of the display housing/flat panel display.

Additionally or alternatively, the hinge mechanism may include biasing components for biasing the tongue in the initial position when no other forces are exerted on the tongue (e.g., when the external forces are zero). For example, a first biasing force may be applied in a first direction through the tilt range and a second biasing force may be applied in a second direction through the collapse range. The biasing forces may be supplied by one or more spring elements. In fact, in some cases, the first biasing force and the balancing force may be supplied by the same spring element.

In one particular embodiment, the hinge mechanism 74 provides a first spring force in the direction of the tilting motion via a first spring element and a second spring force in the direction of the collapsing motion via a second spring element. The first spring force, which includes the balancing and first biasing forces mentioned above, is large as compared to the second spring force, which includes only the second biasing force mentioned above. The first spring force is generally configured to place the tongue of the hinge assembly in the initial hinge position. In order to adjust the tilting angle, the tongue is moved through the tilting range against the first spring force. Once the tilting range is set, the spring force works against the external forces (e.g., weight of the display arrangement) in order to help maintain the desired tilt angle. The second spring force is also configured to place the tongue of the hinge assembly in the initial hinge position. In order to adjust the depth of the display arrangement, the tongue is moved through the collapsing range against the second spring force. The second spring force is generally designed to prevent the tongue and thus the adjustable rear leg from flopping around. As should be appreciated, flopping is generally not desirable because it is not aesthetically pleasing and it exudes low quality (e.g., cheap). The second spring force is also designed with low stiffness. Too much stiffness may make it difficult to package.

Additionally or alternatively, the hinge mechanism may include one or more dampening components for dampening the rotation of the tongue so that it moves in a slow and controlled manner within at least one of the ranges. By way of example, the dampening component may correspond to a friction or braking element that provides resistance to the rapid rotational movement of the tongue about the axis. The resistance may be applied through the tilting range and/or the collapsing range.

Figure 6C:
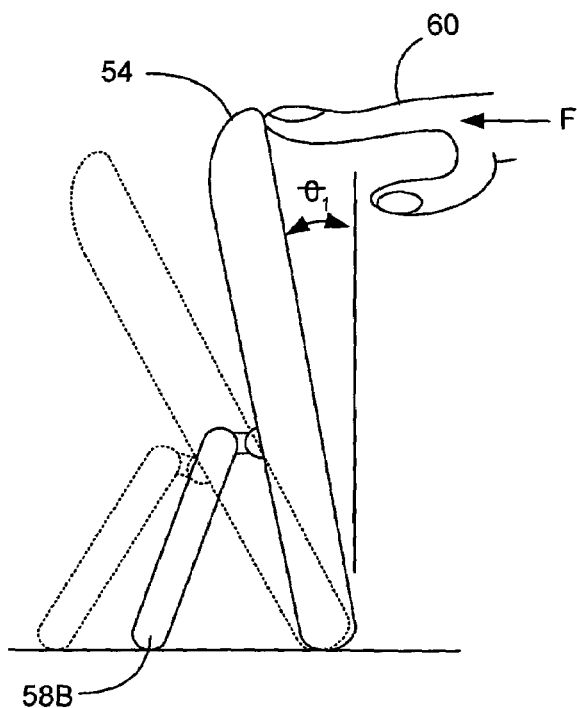
FIG. 6C illustrates the display arrangement moving between the first and second tilt angles of FIGS. 6A and 6B, in accordance with one embodiment of the present invention.
Figure 6D:
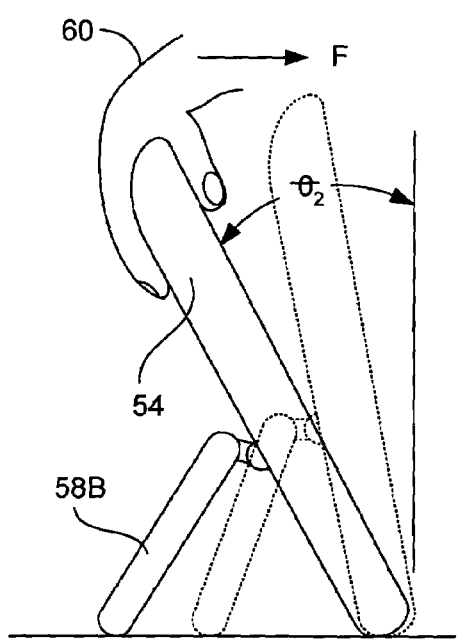
FIG. 6D illustrates the display arrangement moving between the second and first tilt angles of FIGS. 6A and 6B, in accordance with one embodiment of the present invention.

Referring to FIGS. 6A–D, the tilt range will be described in greater detail. FIG. 6A shows the display arrangement 50 at a first tilt angle $\theta_1$, and FIG. 6B shows the display arrangement 50 at a second tilt angle $\theta_2$. FIGS. 6C & D illustrate the display arrangement moving between the first and second tilt angles $\theta_1$ and $\theta_2$. As shown, the second tilt angle $\theta_2$ is larger than the first tilt angle $\theta_1$. The first tilt angle $\theta_1$ is generally produced by positioning the adjustable rear leg 58B a first predetermined distance $X_1$ away from the display housing 54. This leg position generally corresponds to the initial position of the hinge assembly 64. The second tilt angle $\theta_2$ is generally produced by positioning the adjustable rear leg 58B a second predetermined distance $X_2$ away from the display housing 54. The second predetermined distance $X_2$ is generally further than the first predetermined distance $X_1$. This leg position generally corresponds to the fully tilted hinge position of the hinge assembly 64. As shown in FIGS. 6C & D, a user 60 may adjust the tilt angle $\theta$ by exerting a force on the display housing 54. For example, the user 60 may increase the tilt angle by pushing on the front of the display housing as shown in FIG. 6C, and the user may decrease the tilt angle by pulling up on the display housing as shown in FIG. 6D. Although only these positions are shown, it should be appreciated that the adjustable rear leg 58B may be moved anywhere between these two positions.

Figure 7C:
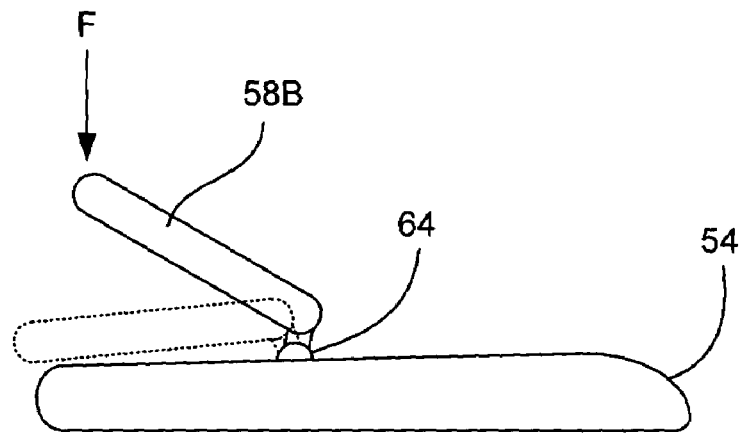
FIG. 7C illustrates the display arrangement moving between the first and second depths of FIGS. 7A and 7B, in accordance with one embodiment of the present invention.
Figure 7A:
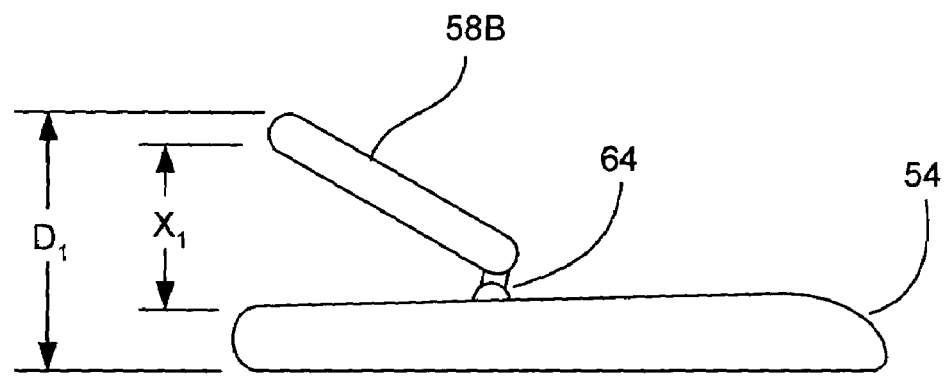
FIG. 7A is a side view of the display arrangement at a first depth, in accordance with one embodiment of the present invention.
Figure 7B:
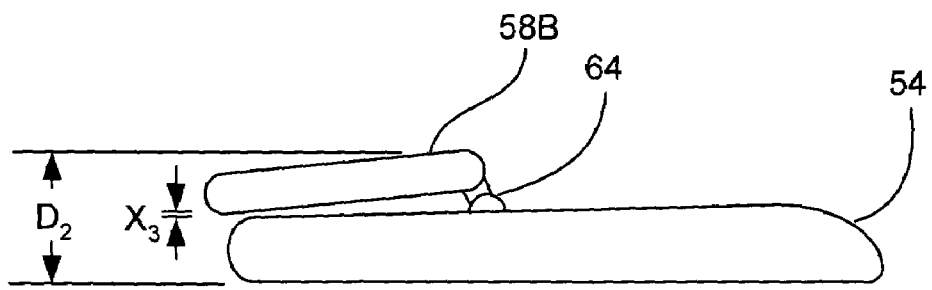
FIG. 7B is a side view of the display arrangement at a second depth, in accordance with one embodiment of the present invention.

Referring to FIGS. 7A–C, the collapsing range will be described in greater detail. FIG. 7A shows the display arrangement 50 at a first depth $D_1$, and FIG. 7B shows the display arrangement 50 at a second depth $D_2$. FIG. 7C illustrates the display arrangement moving between the first and second depths $D_1$ and $D_2$. As shown, the depth $D_1$ is larger than the depth $D_2$. The depth $D_1$ is generally produced by positioning the adjustable rear leg 58B a first predetermined distance $X_1$ away from the display housing 54. This leg position generally corresponds to the initial position of the hinge assembly 64. The depth $D_2$ is generally produced by positioning the adjustable rear leg 58B a third predetermined distance $X_3$ away from the display housing 54. The third predetermined distance $X_3$ is generally closer than the first predetermined distance $X_1$. This leg position generally corresponds to the fully collapsed hinge position of the hinge assembly 64. As shown in FIG. 7C, the depth D of the display arrangement 50 may be adjusted by exerting a force F on the adjustable rear leg 58B so that the adjustable rear leg 58B is moved closer to the display housing 54. Although only these positions are shown, it should be appreciated that the adjustable rear leg 58B may be moved anywhere between these two positions.

Figure 8:
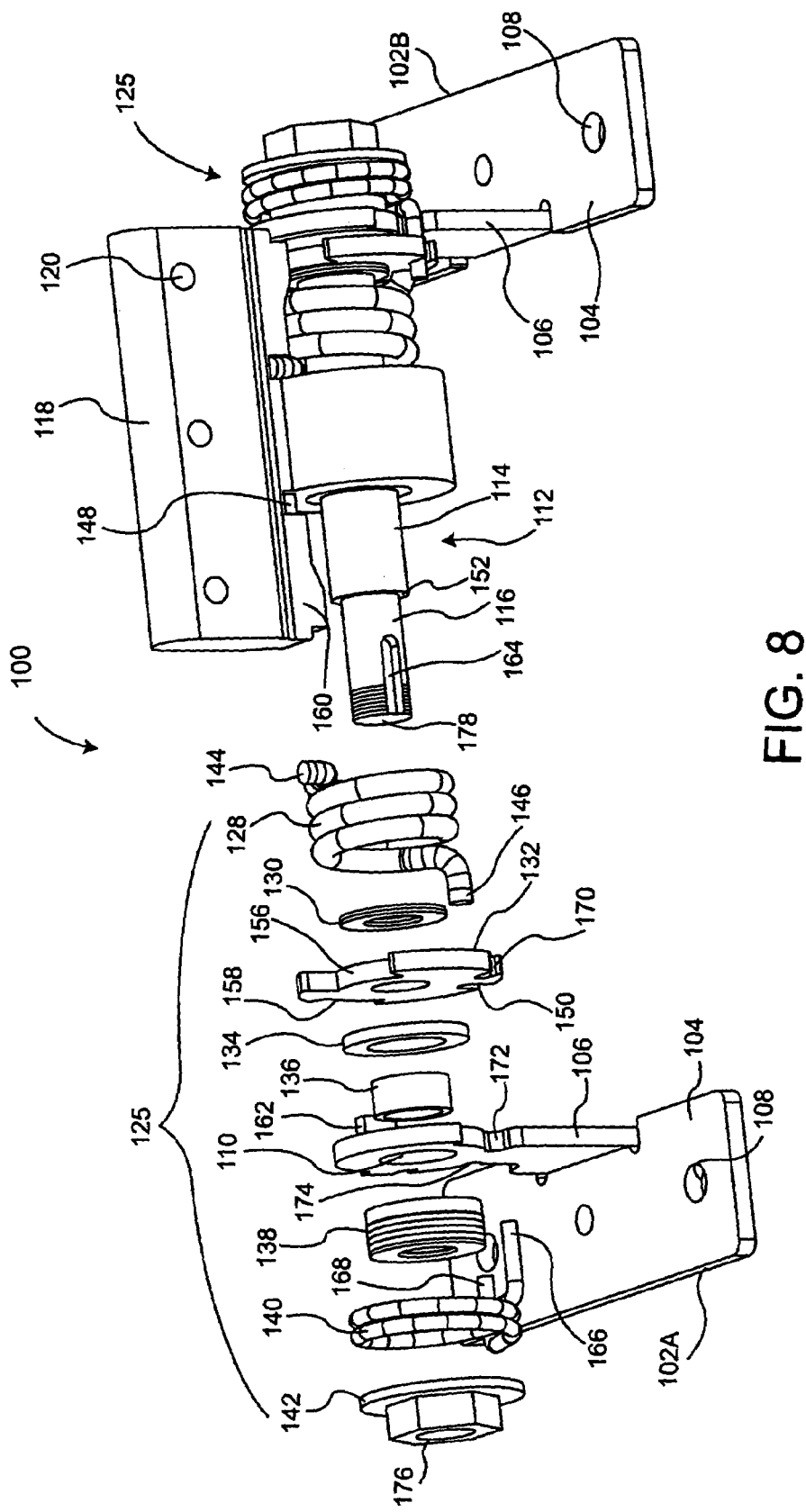
FIG. 8 is a perspective view of a hinge assembly, in accordance with one embodiment of the present invention.

FIG. 8 is a perspective view of a hinge assembly 100, in accordance with one embodiment of the present invention. By way of example, the hinge assembly 100 may correspond to the hinge assembly 64 shown in FIGS. 3–7. For ease of discussion, the first side of the hinge assembly 100 is shown assembled together and the second side of the hinge assembly 100 is shown exploded. The hinge assembly 100 generally includes a pair of hinge stands 102 that are spaced apart to form left and right hinge stands 102A and 102B, respectively. Each of the of the hinge stands 102 includes a mount 104 and a bracket 106 extending perpendicular from the mount 104. The mounts 104 provide a structure for mounting the hinge assembly 100 to the display housing (or frame, chassis). As shown, the mounts 104 include a plurality of screw holes 108 through which a screw may be placed to secure the mounts 104 to the display housing. The brackets 106, on the other hand, provide a structure for supporting the other components of the hinge assembly 100. As shown, each of the brackets 106 includes a through hole 110 for receiving opposing ends of a shaft 112. The shaft 112 rotates within the through holes 110 so as to provide the pivoting motion of the hinge assembly 100. The shaft 112 includes an inner and outer portion 114 and 116, respectively. The outer portion 116 is located at the opposing ends of the shaft 112. The outer portion 116 is dimensioned for receipt in the through holes 110 of the brackets 106. The inner portion 114 is dimensioned to have a greater diameter than the outer portion 116. A tongue 118 is attached to the inner portion 114 of the shaft 112. The tongue 118 provides a structure for transmitting the pivoting motion of the shaft 112 to an adjustable leg. As shown, the tongue 118 includes a plurality of screw holes 120 through which a screw may be placed to secure the tongue 118 to the adjustable leg.

Both sides of the hinge assembly 100 include hinging mechanisms 125. The hinging mechanisms 125 are configured to cooperate with one another to control the movement of the tongue 118. For example, the hinging mechanisms 125 provide the tongue 118 with controlled tilting and collapsing actions. When used in a display arrangement, the tilting action allows the user to adjust the tilting angle of the display arrangement and the collapsing action allows the user to reduce the depth (e.g., profile) of the display arrangement so that it may be efficiently packed or more easily carried.

Each of the hinge mechanisms 125 includes a first torsion spring 128, a first set of washers 130 (or washer), a stop plate 132, a collar 136, a second set of washers 138 (or washer), a second torsion spring 140, and a nut 142. The first torsion spring 128 is dimensioned to fit over the inner portion 114 of the shaft 112. The first torsion spring 128 includes a first end 144 and a second end 146 for coupling the spring to other components. The first end 144 is configured for insertion into a groove 148 in the tongue 118, and the second end 146 is configured for insertion into a first slot 150 on the stop plate 132. When inserted, the first torsion spring 128 provides a spring bias between the tongue 118 and the stop plate 132. The first washer 130 includes a through hole, which is dimensioned for receiving the outer portion 116 of the shaft 112. When assembled, the inner side of the first washer 130 is configured to abut a shoulder 152 formed by the inner portion 114 of the shaft 112 and the outer side of the first washer 130 is configured to abut the inner side of the stop plate 132. Like the first washer 130, the stop plate 132 includes a through hole that is dimension for receiving the outer portion 116 of the shaft 112.

The stop plate 132 itself includes a pair of cut outs 156 and 158 for limiting the motion of various components through the hinge assembly 100. The first cut out 156 is configured to limit the pivoting nature of the tongue 118 in a first direction. The second cut out 158 is configured to limit the pivoting nature of the tongue 118 in a second direction. As shown, the first cut out 156 receives a lip 160 of the tongue 118. The size of the first cut out 156 defines the range of motion for the tilting action. That is, a first side of the cut out 156 serves as a first abutment stop for the lip 160 (e.g., initial position) and a second side of the cut out 156 serves as a second abutment stop for the lip 160 (fully tilted position). The second cut out 158, on the other hand, is configured to receive a protrusion 162 that extends inwardly from the bracket 106. The size of the second cut out 158 defines the range of motion for the collapsing action. That is, a first side of the cut out 158 serves as a first abutment stop for the protrusion 162 (e.g., initial position) and a second side of the cut out 158 serves as a second abutment stop for the protrusion 162 (e.g., fully collapsed position).

To elaborate further, the through hole 110 of the bracket 106 is dimensioned for receiving the collar 136. The collar 136 includes a through hole that is dimensioned for receiving the outer portion 116 of the shaft 112. When assembled, the inner side of the collar 136 abuts the outer side of the stop plate 132 and the outer side of the collar 136 abuts the inner side of the second washers 138. Further still, the outer side of the bracket 106 abuts the inner side of the second washers 138. The second washers 138 include a through hole that is dimensioned for receiving the outer portion 116 of the shaft 112. The second washers 138 may include a protrusion within the through hole for engaging a longitudinal slot 164 in the outer portion 116 of the shaft 112. When assembled, the inner side of the second washer 138 abuts the outer side of the collar 136 and the bracket 106 and the outer side of the second washer 138 abuts the inner side of the nut 142. The second torsion spring 140 is dimensioned to fit over the second washers 138. The second torsion spring 140 includes a first end 166 and a second end 168 for coupling the spring 140 to other components. The first end 166 is configured for insertion into a second slot 170 on the stop plate 132, and the second end 168 is configured for insertion into a first recess 174 on the bracket 106. When assembled, the second torsion spring 140 provides a spring bias between the bracket 106 and the stop plate 132. The nut 142 includes an interior thread 176 for threadably engaging an exterior thread 178 located at the end of the outer portion 116 of the shaft 112. When assembled, the inner side of the nut 142 abuts the outer side of the second washers 138.

During the tilting action, the tongue 118 is configured to rotate relative to the stop plate 132 and the bracket 106. In particular, the stop plate 132 hits the protrusion 162, resulting in rotation between the stop plate 132 and the collar 136 as well as between the collar 136 and the second washers 138. The forces that cause rotation of the tongue/shaft work against the spring force supplied by the first torsion spring 128 and the friction force supplied axially by the nut 142. As should be appreciated, the nut 142 transmits an axial load through the second washers 138, through the collar 136, through the stop plate 132, through the first washer 130 and into the shoulder 152 on the inner portion 114 of the shaft 112. The spring force helps hold the tongue 118 in a desired position in the tilting range and to place the tongue 118 in the initial position. The friction force dampens the motion of the rotating tongue/shaft, i.e., the tongue/shaft moves in a slow and controlled manner. The amount of friction can be controlled by careful selection of the second washers 138 and the axial load being supplied by the nut 142. By way of example, the second washers 138 may be thrust washers.

During the collapsing action, the collar 136 decouples the axial load from the bracket 106 while still providing a load through the other remaining components. As such, the tongue 118 and stop plate 132 move together relative to the bracket 106, i.e., because the axial load is decoupled from the bracket 106, the tongue/shaft/stop plate can rotate freely as a unit relative to the bracket 106. The forces that cause rotation of the tongue/shaft/stop plate work against the spring force supplied by the second torsion spring 140. The spring force helps place the tongue in the initial position. Although shown herein, the hinge assembly 100 may be assembled without the second torsion spring 140. In cases such as these, however, the tongue 118 and therefore the adjustable rear leg attached thereto may flop through the tilting range (it is believed that the spring gives the hinge assembly a better feel).

A friction washer 134 may be inserted between the bracket 106 and the stop plate 132 in order to dampen the motion of the rotating tongue/shaft/stop plate (in order to improve some of the bounciness). As should be appreciated, the collapsing motion has essentially zero friction without the use of the friction washer 134, i.e., since there is no axial load on the bracket 106. The friction washer 134 is configured to provide friction between the stop plate 132 and bracket 106 so that the tongue/shaft/stop plate move in a slow and controlled manner. As shown, the friction washer 134 includes a through hole that is dimensioned for receiving the collar 136. When assembled, the inner side of the friction washer 134 generally abuts the outer side of the stop plate 132 and the outer side of the friction washer 134 generally abuts the inner side of the bracket 106. The amount of friction can be controlled by adjusting the thickness of the friction washer. By way of example, the friction washer may be a Delrin washer (or washers).

Referring to FIGS. 9A–C, the tilting and collapsing action of the hinge assembly 100 will be described in greater detail. FIG. 9A illustrates the tongue 118 in an initial position. FIG. 9B illustrates the tongue 118 in a full tilt position. FIG. 9C illustrates the tongue 118 in a full collapse position. In the initial position as shown in FIG. 9A, the tongue 118 is held in place by the biasing force of the first torsion spring 128. The first torsion spring 128 exerts a force F1 between the tongue 118 and the stop plate 132 so that the lip 160 of the tongue 118 abuts a first abutment stop 180 of the first cut out 156 of the stop plate 132 thereby preventing any movement of the tongue 118 relative to the stop plate 132. Also in this position, the stop plate 132 is held in place by the biasing force of the second torsion spring 140. The second torsion spring 140 exerts a force F2 between the stop plate 132 and the bracket 106 so that a first abutment stop 182 of the second cut out 158 of the stop plate 132 abuts the protrusion 162 of the bracket 106 thereby preventing any movement of the stop plate 132 relative to the bracket 106.

During a tilting action, the tongue 118 moves relative to the stop plate 132 between the first abutment stop 180 and the second abutment stop 184 of the first cut out 156 of the stop plate 132 when an external force E is exerted on the tongue 118. By way of example, the external force E may be transferred through the display arrangement from a finger of a user that pushes or pulls on the display arrangement (for example, as shown in FIGS. 6C & D). As shown, the protrusion 162 of the bracket 106 prevents the stop plate 132 from moving with the tongue 118 during the tilting action, i.e., the stop plate 132 is essentially an extension of the fixed bracket 106 at this time. As a result, the tongue 118 moves against the biasing force F1 provided by the first torsion spring 128. The tongue 118 also moves against the friction forces exerted on the shaft 112 by the axial load of the nut 142. In particular, the nut 142 transmits an axial load through the thrust washers 138, through the collar 136, through the stop plate 132, through the first washer 130 and onto the shoulder 152 of the inner portion 114 of the shaft 112. When positioned in a display arrangement, the biasing force F1 and friction forces are preferably balanced with the weight of the display arrangement so that the tongue 118 and thus the adjustable rear leg remains static once the external force E is removed from the tongue 118. That is, once the user finds a desired tilt angle by pushing or pulling on the display arrangement, the tongue of hinge assembly is configured to hold its position so that the desired tilt angle of the display arrangement is maintained.

In the full tilt position as shown in FIG. 9B, the tongue 118 is prevented from further movement relative to the stop plate 132 via the second abutment stop 184 of the first cut out 156 of the stop plate 132. The tongue 118 is generally placed in this position by an external force, i.e., the external force causes the tongue 118 to rotate from the first abutment stop 180 to the second abutment stop 184. The external force generally works against the spring force F1. When the external force is removed from the tongue 118, the tongue 118 is generally held in place in the full tilt position by force balance. In essence, the friction forces and weight of the display arrangement counteract the spring force F1 so that the sum of the forces acting on the tongue 118 is zero. In the full tilt position as shown, the tilt angle of the display arrangement is typically at its maximum value. The positions of the abutment stops 180, 184 generally define the amount of tilt and the initial and final tilt angle allowed by the hinge assembly 100. By way of example, the abutment stops may allow about 25 degrees of tilt, as for example between about 10 and about 35 degrees.

During the collapsing action, the tongue 118 moves relative to the bracket 106 when an external force E2 is exerted on the tongue 118. During this action, the stop plate 132 is free to move along with the tongue 118. In fact, when the tongue 118 is collapsed, the first abutment stop 182 of the second cut out 158 rotates away from the protrusion 162 until the second abutment stop 186 of the second cut out 158 hits the protrusion 162 thereby preventing further movement. During rotation, the tongue 118 moves against the biasing force F2 provided by the second torsion spring 140. Unlike above, however, the tongue 118 does not move against the friction forces exerted on the shaft 112 by the axial load of the nut 142. In this movement direction, all of the components including nut 142, thrust washers 138, collar 136, stop plate 132, first washer 130, shaft 112 and tongue 118 rotate together. Although the tongue does not move against the friction forces provided by the nut 142, it does move against the friction forces provided by the friction washer 134. The friction washer 134 is configured to provide friction forces for only the collapsing motion in order to remove some of the bounciness and improve the overall feel of the hinge assembly 100. The level of the friction force is generally dependent on the thickness and material used for the friction washer 134. Alternatively, the friction washer 134 may be removed. If the friction washer 134 is left out of the hinge assembly 100, the collapsing motion has essentially zero friction since there is no axial load on the hinge brackets 106 at this time.

In the full collapse position as shown in FIG. 9C, the tongue 118 is prevented from further movement relative to the bracket 106 via the second abutment stop 186 of the second cut out of the stop plate 132. The tongue 118 is generally placed in this position by an external force, i.e., the external force causes the stop plate 132 to rotate so that the second abutment stop 186 engages the protrusion 162 rather than the second abutment stop 182. The external force generally works against the spring force F2. When the external force is removed from the tongue 118, the tongue 118 is allowed to move back to the initial position via the spring force F2. Alternatively, the second torsion spring 140 may be removed. If the second torsion spring 140 is left out of the hinge assembly 100, the collapsing motion has no biasing force and thus it may flop to any position between the first and second abutment stops of the second cut out.

Under normal use, when the display is standing upright in the easel configuration, the weight and geometry of the display causes the tongue 118 to rotate towards the stop 184 of the first cut out on the stop plate 132. The stop plate 132 itself is prevented from rotating by the abutment stop 182 on the bracket 106. The torsion spring 128 is generally chosen such that it provides enough torque to counteract the weight of the display. This allows the user to position the display such that the tongue 118 remains stationary at any given position between stops 184 and 180. If the display were lifted off of the table surface, the spring 128 would cause the tongue 118 to return to the stop 180. Axial friction provided by the end nut 176 dampens this motion so that when the user adjusts the tilt angle of the display it doesn't feel springy.

Figure 10:
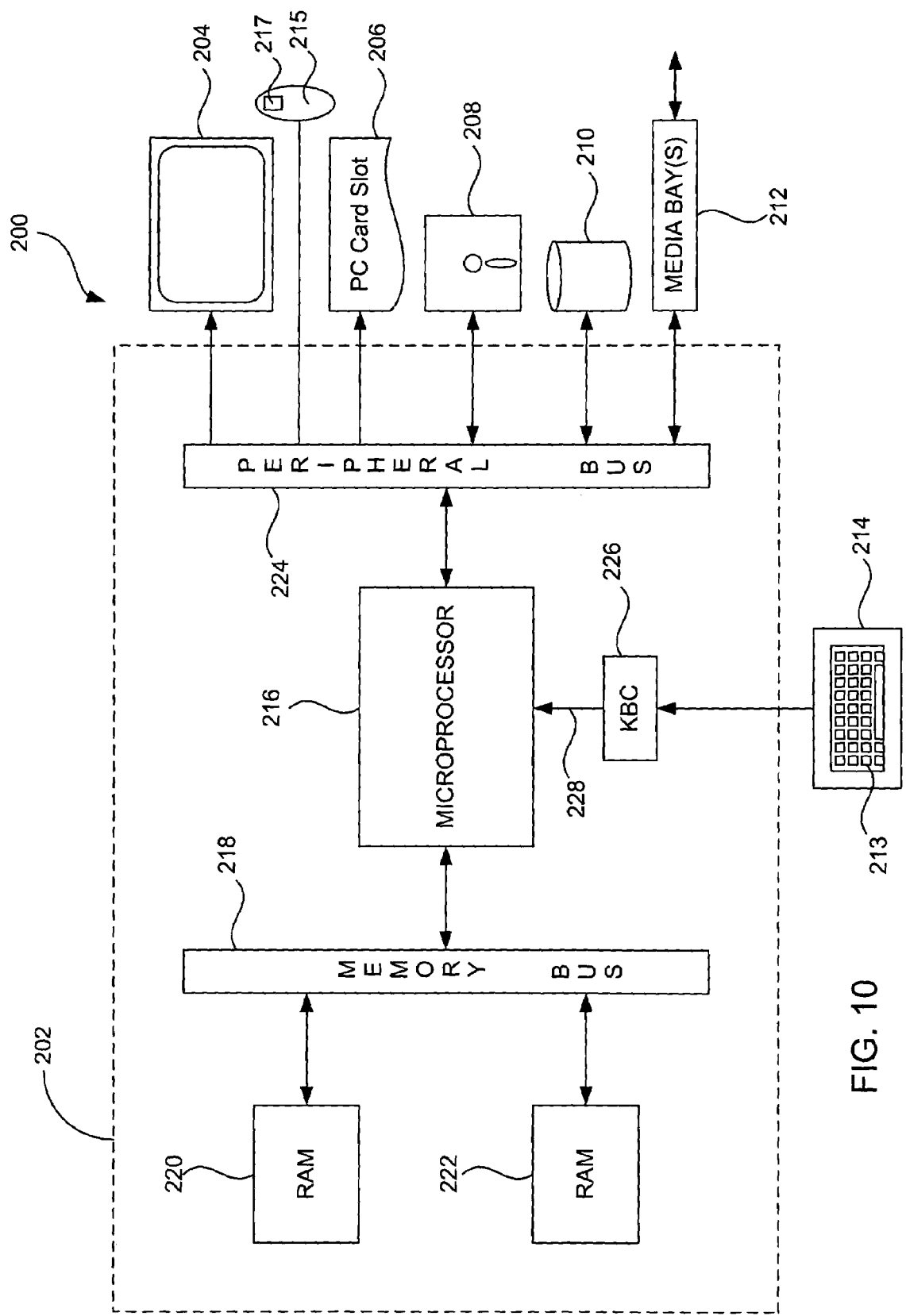
FIG. 10 is a block diagram of a computer system, in accordance with one embodiment of the present invention.

FIG. 10 is a block diagram of an exemplary computer system 200 that can utilize the invention. The computer system 200 includes a computer 202, a display arrangement 204, a printer 206, a floppy disk drive 208, a hard disk drive 210, media bay(s) 212, a keyboard 214 and an input device 215. The computer 202 includes a microprocessor 216, a memory bus 218, random access memory (RAM) 220, read only memory (ROM) 222, a peripheral bus 224, and a keyboard controller 226. The computer 202 can be a personal computer, a workstation computer, or some other type of computer. In one embodiment, the computer corresponds to a general purpose computer such as an IBM compatible computer or an Apple compatible computer. By way of example, the Apple compatible computer may include different models such as the iMac, G3, G4, Cube, iBook, or Titanium models, which are manufactured by Apple Computer, Inc. of Cupertino, Calif.

The microprocessor 216 is a general purpose digital processor which controls the operation of the computer system 200. The microprocessor 216 can be a single-chip processor or can be implemented with multiple components. Using instructions retrieved from memory, the microprocessor 216 controls the reception and manipulation of input data and the output and display of data on output devices. According to the invention, some particular functions of microprocessor 216 is to provide and display a graphical user interface (GUI) on the display arrangement 204.

The memory bus 218 is used by the microprocessor 216 to access the RAM 220 and the ROM 222. The RAM 220 is used by the microprocessor 216 as a general storage area and as scratch-pad memory, and can also be used to store input data and processed data. The RAM 220 also preferably stores the various data structures illustrated in the previous Figures. The ROM 222 can be used to store instructions or program code followed by the microprocessor 216 as well as other data.

The peripheral bus 224 is used to access the input, output, and storage devices used by the digital computer 202. In the described embodiment, these devices include the display arrangement 204, the printer device 206, the floppy disk drive 208, the hard disk drive 210, and the media bay(s) 212. The keyboard controller 226 is used to receive input from the keyboard 214 and send decoded symbols for each pressed key to the microprocessor 216 over bus 228. Alternatively, the keyboard may be connected to the peripheral bus 224.

The display arrangement 204 is an output device that displays images of data provided by the microprocessor 216 via the peripheral bus 224 or provided by other components in the computer system 200. By way of example, the display arrangement may correspond to any of those described herein. The printer device 206 when operating as a printer provides an image on a sheet of paper or a similar surface. Other output devices such as a plotter, typesetter, etc. can be used in place of, or in addition to, the printer device 206.

The floppy disk drive 208 and the hard disk drive 210 can be used to store various types of data. The floppy disk drive 208 facilitates transporting such data to other computer systems, and hard disk drive 210 permits fast access to large amounts of stored data.

The microprocessor 216 together with an operating system operate to execute computer code and produce and use data. The computer code and data may reside on the RAM 220, the ROM 222, or the hard disk drive 220. The computer code and data could also reside on a removable program medium and loaded or installed onto the computer system 200 when needed. Removable program mediums include, for example, CD-ROM, PC-CARD, floppy disk, magnetic tape, and a network component.

The one or more media bays (expansion bays) 212 are used to receive media bay devices (expansion bay devices) to provide greater resources to the computer system. As examples, the types of devices include a floppy drive, a hard drive, a CD-ROM drive, a DVD drive, or a battery. The media bays are accessible from external to the computer system so that media bay devices can be easily be inserted into the media bays or removed from the media bays. The removability of the media bay devices allows a few media bays to support a variety of different types of devices in a flexible manner.

The keyboard 214 is used by a user to input commands and other instructions to the computer system 200. For example, the keyboard 214, which includes a plurality of keys 213, may allow a user of the computer system 200 to enter alphanumeric data. In addition, the keyboard may include a command generator (in the form of a key) for executing tasks such as GUI selections.

The input devices 215 are used by a user to manipulate movements on a display screen of a general-purpose computer, i.e., the input devices may be used to move a cursor or pointer or to implement a scrolling function. By way of example, the input devices may take the form of a mouse, a track ball, a touch pad, a stylus, a tablet and the like. The input devices may also allow a user to make selections via a command generator 217 such as a button.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A display arrangement, comprising:
a flat panel display;
a display housing for the flat panel display;
an adjustable leg for supporting the display housing and thus the flat panel display in an inclined position;
a hinge for coupling the adjustable leg to the display housing so that the adjustable leg is pivotable relative to the display housing, the hinge being configured to provide a tilting action for adjusting the tilt angle of the display arrangement, and a collapsing action for reducing the depth of the display arrangement, the hinge exerting one or more motion controlling forces on the adjustable leg during the tilting and collapsing actions, the hinge providing a first biasing force in a first direction during the tilting action, a second biasing force in a second direction during the collapsing action, a first braking force during the tilting action, and a second braking force during the collapsing action; and
a pair of fixed legs attached to the display housing, the fixed and adjustable legs providing a base for the display arrangement when the display arrangement is positioned in an upright or nearly upright position, the fixed and adjustable legs being spaced in a manner that provides three point stability to the display arrangement.

2. The display arrangement as recited in claim 1 wherein the flat panel display is a liquid crystal display.

3. The display arrangement as recited in claim 1 wherein during the tilting action the adjustable leg is outwardly movable so as to place the adjustable leg away from the display housing, and wherein during the collapsing action, the adjustable leg is inwardly movable so as to place the adjustable leg next to the display housing.

4. The display arrangement as recited in claim 1 wherein during the tilting action, the adjustable leg pivots relative to the display housing in a first direction between a first angle and a second angle, and wherein the during the collapsing action, the adjustable leg pivots relative to the display housing in a second direction between the first angle and a third angle, the first angle placing the adjustable leg a first distance away from the display housing so as to provide a first tilt angle, the second angle placing the adjustable leg a second distance away from the display housing so as to provide a second tilt angle, the third angle placing the adjustable leg proximate the display housing so as to reduce the depth of the display arrangement.

5. The display arrangement as recited in claim 4 wherein the first tilt angle is 10 degrees and the second tilt angle is 30 degrees.

6. An easel enclosure for a display, comprising:
a body configured to carry the display;
an adjustable leg for supporting the body in an inclined position;
a hinge for pivotally coupling the adjustable leg to the body, the hinge allowing the adjustable leg to pivot through a collapsing range and a tilting range, the collapsing range allowing the adjustable leg to be placed between a storage position against the body and a first tilt position away from the body, and the tilting range allowing the adjustable leg to be placed between the first tilt position and a second tilt position that is further away from the body than the first tilt position, the hinge exerting one or more motion controlling forces on the adjustable leg through the collapsing and tilting ranges, the hinge providing a biasing force in a first direction through the tilting range, and a second biasing force in a second direction through the collapsing range.

7. The easel enclosure as recited in claim 6 wherein the hinge includes a base for providing a connection point to the body, and a tongue that rotates relative to the base and that provides a connection point to the adjustable leg, the rotation of the tongue defining the collapsing and tilting range of the adjustable leg.

8. The easel enclosure as recited in claim 6 wherein the body is positioned in a first inclined position when the adjustable leg is placed in the first tilt position, and wherein the body is positioned in a second inclined position when the adjustable leg is placed in the second tilt position.

9. The easel enclosure as recited in claim 6 wherein the overall depth of the easel enclosure is reduced when the adjustable leg is placed in the storage position.

10. The easel enclosure as recited in claim 6 wherein the biasing forces position the adjustable leg in the first tilt position when substantially no other forces are exterted on the adjustable leg.

11. The easel enclosure as recited in claim 10 wherein the first biasing force is greater than the the second biasing force, the first biasing force working against the weight of the display in order to maintain the desired tilt angle between the first tilt position and the second tilt positions, the second biasing force preventing the adjustable leg from freely pivoting between the first tilt position and the storage position.

12. The easel enclosure as recited in claim 11 wherein the hinge includes a first spring element that provides the first biasing force through the tilting range, and a second spring element that provides the second biasing force through the collapsing range.

13. An easel enclosure for a display, comprising:
a body configured to carry the display;
an adjustable leg for supporting the body in an inclined position;
a hinge for pivotally coupling the adjustable leg to the body, the hinge allowing the adjustable leg to pivot through a collapsing range and a tilting range, the collapsing range allowing the adjustable leg to be placed between a storage position against the body and a first tilt position away from the body, and the tilting range allowing the adjustable leg to be placed between the first tilt position and a second tilt position that is further away from the body than the first tilt position, the hinge including a base for providing a connection point to the body, and a tongue that rotates relative to the base and that provides a connection point to the adjustable leg, the rotation of the tongue defining the collapsing and tilting range of the adjustable leg, the tongue having a collapse position that corresponds to the storage position, an initial tilt position that corresponds to the first tilt position, and a final tilt position that corresponds to the second tilt position, wherein the collapse position is located on a first side of the initial tilt position, and the final tilt position is located on a second side of the initial tilt position.

14. The easel enclosure as recited in claim 13 wherein the hinge also includes a hinge mechanism for controlling the motion of the tongue relative to the base.

15. The easel enclosure as recited in claim 14 wherein the hinge includes one or more positioning components for locking or holding the tongue in a desired position, as for example, a position between the collapse position, the initial tilt position and the final tilt position.

16. The easel enclosure as recited in claim 15 wherein the position component is a spring.

17. The easel enclosure as recited in claim 14 wherein the hinge includes one or more biasing components for biasing the tongue in one of its positions, as for example, the collapse position, the initial tilt position and the final tilt position.

18. The easel enclosure as recited in claim 17 wherein the biasing component is a spring.

19. The easel enclosure as recited in claim 14 wherein the hinge provides a first spring force in the direction of the tilting motion via a first spring element and a second spring force in the direction of the collapsing motion via a second spring element.

20. The easel enclosure as recited in claim 19 wherein the first spring force is large as compared to the second spring force.

21. The easel enclosure as recited in claim 14 wherein the hinge includes one or more dampening components for dampening the rotation of the tongue so that it moves in a slow and controlled manner.

22. An easel enclosure for a display, comprising:
a body configured to carry the display;
an adjustable leg for supporting the body in an inclined position;
a hinge for pivotally coupling the adjustable leg to the body, the hinge allowing the adjustable leg to pivot through a collapsing range and a tilting range, the collapsing range allowing the adjustable leg to be placed between a storage position against the body and a first tilt position away from the body, and the tilting range allowing the adjustable leg to be placed between the first tilt position and a second tilt position that is further away from the body than the first tilt position, the hinge comprising
a pair of spaced apart hinge stands, the hinge stands being mounted to the body;
a shaft rotatable relative to the hinge stands;
a tongue attached to the shaft and mounted to the adjustable leg, the tongue being rotatable with the shaft in a first direction and a second direction, the few direction corresponding to the tilting range, the second direction corresponding to the collapsing range;
a stop plate configured to limit the motion of the tongue in the first and second directions;
a spring element capable of providing a spring bias between the tongue and the stop plate in the first direction; and
a dampening mechanism capable of dampening the motion of the tongue in either the first direction or the second direction.

23. The easel enclosure as recited in claim 22 wherein the stop plate is an extension of at least one of the hinge stands during the tilting action, and wherein the stop plate is movable relative to the hinge stand during the collapsing action.

24. A hinge assembly for use in an easel like enclosure, the hinge assembly being configured to provide a tilting action in a first direction and a collapsing action in a second direction, the hinge assembly comprising:

a pair of spaced apart hinge stands, the hinge stands including a through hole, the hinge stands being mountable to a housing of the easel like enclosure;
a rotatable shaft having an inner portion and an outer portion, the inner portion having a lager diameter than the outer portion so as to form a shoulder, the outer portion being inserted within the through holes of the hinge stands;
a tongue attached to the inner portion of the shaft such that it rotates with the shaft in the first and second directions, the tongue being mountable to a leg of the easel like enclosure;
a stop plate having a through hole for receiving the outer portion of the shaft, the stop plate being positioned on the outer portion of the shaft between the shoulder and a portion of a first hinge stand, the stop plate being configured to limit the rotation of the tongue in the first and second directions; and
a collar inserted within the through hole of the first hinge stand, the collar having a through hole for receiving the outer portion of the shaft, the collar being positioned on the outer portion of the shaft between the stop plate and a nut coupled to the end of the outer portion of the shaft and capable of exerting an axial load, the collar being configured to couple the axial load to the stop plate and onto the shoulder of the inner portion of the shaft and to decouple the axial load from the hinge stand.

25. The hinge as recited in claim 24 wherein the stop plate is an extension of the first hinge stand during the tilting action, and wherein the stop plate is movable relative to the hinge stand during the collapsing action.

26. The hinge as recited in claim 24 further comprising:
a first washer disposed between the shoulder and the stop plate and including a through hole dimensioned to fit over the inner portion of the shaft;
a second washer disposed between the hinge stands and the nut and including a through hole dimensioned to fit over the outer portion of the shaft, and
wherein the nut transmits an axial load through the second washer, through the collar, through the stop plate, through the fist washer and into the shoulder on the shaft.

27. The hinge as recited in claim 26 wherein the tongue moves against friction forces exerted on the shaft by the axial load of the nut during the tilting action, and wherein the tongue does not move against the friction forces exerted on the shaft by the axial load of the nut during the collapsing action.

28. The hinge as recited in claim 26 wherein the nut, washers, collar, stop plate, shaft and tongue rotate as a unit during the collapsing action.

29. The hinge as recited in claim 26 further comprising:
a torsion spring dimensioned to fit over the inner portion of the shaft, the first torsion spring providing a spring bias between the tongue and the stop plate; and
a second torsion spring dimensioned to fit over the outer portion of the shaft, the first torsion spring providing a spring bias between the hinge stand and the stop plate.

30. The hinge as recited in claim 29 further comprising:
a friction washer having a through hole that is dimension for receiving the collar, the friction washer being disposed between the hinge stand and the stop plate in order to dampen the motion during the collapsing action.

31. The hinge as recited in claim 29 wherein the stop plate includes a pair of cut outs, a first cut out limiting the pivoting nature of the tongue in the first direction, a second cut out limiting the pivoting nature of the tongue in the second direction, the first cut out receiving a portion of the tongue, the size of the first cut out defining the range of motion for the tilting action, the second cut out receiving a protrusion that extends from the hinge stand, the size of the second cut out defining the range of motion for the collapsing action.

32. The hinge as recited in claim 31 wherein during the tilting action an end of the second cut out engages the protrusion thereby preventing further rotation of the stop plate and wherein during the collapsing action the end of second cut out disengages from the protrusion thereby allowing rotation of the stop plate.

33. An easel enclosure for a display, comprising:
a body configured to carry the display;
an adjustable leg for supporting the body in an inclined position;
a hinge for pivotally coupling the adjustable leg to the body, the hinge allowing the adjustable leg to pivot through a collapsing range and a tilting range, the collapsing range allowing the adjustable leg to be placed between a storage position against the body and a first tilt position away from the body, and the tilting range allowing the adjustable leg to be placed between the first lit position and a second tilt position that is further away from the body than the first tilt position, the hinge exerting one or more motion controlling forces on the adjustable leg through the collapsing and tilting ranges, the hinge providing a braking force through the tilting range.

34. An easel enclosure for a display, comprising:
a body configured to cry the display;
an adjustable leg for supporting the body in an inclined position;
a hinge for pivotally coupling the adjustable leg to the body, the hinge allowing the adjustable leg to pivot through a collapsing range and a tilting range, the collapsing range allowing the adjustable leg to be placed between a storage position against the body and a first tilt position away from the body, and the tilting range allowing the adjustable leg to be placed between the first tilt position and a second tilt position that is further away from the body than the first tilt position, the hinge exerting one or more motion controlling forces on the adjustable leg through the collapsing and tilting ranges, the hinge providing a braking force through the collapsing range.

* * * * *